(12) United States Patent
Crawford et al.

(10) Patent No.: US 11,440,234 B2
(45) Date of Patent: Sep. 13, 2022

(54) PROCESS FOR MANUFACTURING A COMPONENT FOR AN EMISSIONS TREATMENT UNIT

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto (CA)

( * ) Notice: Subject to any disclaimer, the term of this patent is extended or adjusted under 35 U.S.C. 154(b) by 46 days.

(21) Appl. No.: 17/001,510

(22) Filed: Aug. 24, 2020

(65) Prior Publication Data

US 2020/0384676 A1    Dec. 10, 2020

Related U.S. Application Data

(63) Continuation-in-part of application No. 15/650,416, filed on Jul. 14, 2017, now Pat. No. 10,814,276.
(Continued)

(51) Int. Cl.
*B29C 48/11* (2019.01)
*B29D 99/00* (2010.01)
(Continued)

(52) U.S. Cl.
CPC .............. *B29C 48/11* (2019.02); *B01D 53/94* (2013.01); *B28B 11/043* (2013.01); *B28B 11/241* (2013.01); *B29D 99/0089* (2013.01); *C04B 26/02* (2013.01); *C04B 38/0012* (2013.01); *F01N 3/0222* (2013.01); *H05B 6/108* (2013.01); *B29C 48/0022* (2019.02); *B29C 48/022* (2019.02); *B29C 48/345* (2019.02); *C04B 2111/0081* (2013.01); *F01N 2510/02* (2013.01); *Y02T 10/12* (2013.01); *Y10T 29/49345* (2015.01)

(58) Field of Classification Search
CPC ...................... B29D 99/0089; Y10T 29/49345
See application file for complete search history.

(56) References Cited

U.S. PATENT DOCUMENTS 4,818,317 A * 4/1989 Otaka ................. C04B 38/0006
                                                      55/523
6,840,976 B2 * 1/2005 Vance ................... F01N 3/0222
                                                      427/244

(Continued)

*Primary Examiner* — Sarang Afzali
(74) *Attorney, Agent, or Firm* — Stuart L. Wilkinson (57) ABSTRACT

In a process for manufacturing a component for an emissions treatment unit, green ceramic product is extruded through a die to form an extrusion having a honeycomb substrate structure with an array of parallel, linear tubular cells extending along its length, the cells bounded by walls dividing adjacent cells from one another. A ceramic unit is obtained by cutting off, curing and firing a length of the extrusion a length of the extrusion. Following the firing, a mixture of a flowable, uncured curable material and a particulate metal component is injected from an end of the ceramic unit into selected ones of the cells so as to block the selected cells over at least a part of their lengths while maintaining all of the walls of the ceramic unit. The injected mixture is then cured to render it solid.

18 Claims, 2 Drawing Sheets

Related U.S. Application Data which is a continuation of application No. 13/971,247, filed on Aug. 20, 2013, now Pat. No. 9,737,851, application No. 17/001,510, which is a continuation-in-part of application No. 15/972,187, filed on May 6, 2018, now Pat. No. 10,835,864, which is a continuation-in-part of application No. 15/259,858, filed on Sep. 8, 2016, now Pat. No. 10,352,214, which is a continuation of application No. 14/452,800, filed on Aug. 6, 2014, now Pat. No. 9,488,085.

(60) Provisional application No. 61/910,067, filed on Nov. 28, 2013, provisional application No. 61/879,211, filed on Sep. 8, 2013, provisional application No. 61/733,949, filed on Dec. 6, 2012, provisional application No. 61/692,732, filed on Aug. 24, 2012.

(51) Int. Cl.

| | | |
|---|---|---|
| *B28B 11/24* | (2006.01) | |
| *F01N 3/022* | (2006.01) | |
| *C04B 26/02* | (2006.01) | |
| *C04B 38/00* | (2006.01) | |
| *H05B 6/10* | (2006.01) | |
| *B01D 53/94* | (2006.01) | |
| *B28B 11/04* | (2006.01) | |
| *B29C 48/00* | (2019.01) | |
| *B29C 48/345* | (2019.01) | |
| *C04B 111/00* | (2006.01) | |

(56) References Cited

U.S. PATENT DOCUMENTS

| | | | | |
|---|---|---|---|---|
| 7,128,976 | B2 * | 10/2006 | Hayashi | C08G 77/50 524/588 |
| 8,097,220 | B2 * | 1/2012 | Ramberg | C22B 9/023 210/767 |
| 8,727,760 | B2 * | 5/2014 | Neubauer | B29C 48/303 425/336 |
| 2005/0102987 | A1 * | 5/2005 | Kudo | B01D 46/4218 55/523 |
| 2006/0051264 | A1 * | 3/2006 | Son | F01N 3/035 422/186 |
| 2006/0140813 | A1 * | 6/2006 | Rabiei | B22F 3/1112 148/320 |
| 2007/0252310 | A1 * | 11/2007 | Brockway | C04B 38/0012 264/630 |

* cited by examiner

PROCESS FOR MANUFACTURING A COMPONENT FOR AN EMISSIONS TREATMENT UNIT

CROSS REFERENCE TO RELATED PATENTS

The present application is a continuation in part application of, and claims priority from, U.S. patent application Ser. No. 15/650,416 filed Jul. 14, 2017, entitled "Process for manufacturing a component for a catalytic converter", now issued U.S. Pat. No. 10,814,276, which is a continuation application of, and claims priority from, U.S. patent application Ser. No. 13/971,247 filed Feb. 9, 2014, entitled "A catalytic converter component and process for its manufacture", now issued U.S. Pat. No. 9,737,851, which application claims priority from U.S. Provisional Application Ser. No. 61/692,732 entitled "A catalytic converter component and process for its manufacture," filed Aug. 24, 2012, and from U.S. Provisional Application Ser. No. 61/733,949, entitled "A catalytic converter component and process for its manufacture," filed Dec. 6, 2012, the contents of which applications are expressly incorporated herein in their entirety by reference thereto.

The present U.S. Patent Application is a continuation-in-part application of U.S. patent application Ser. No. 15/972,187 filed May 6, 2018 and entitled "Gaseous emissions treatment components and methods for manufacturing thereof", which is a continuation-in-part application of U.S. patent application Ser. No. 15/259,858 filed Sep. 8, 2016, now issued as U.S. patent Ser. No. 10/352,214 and entitled "Gaseous emissions treatment structures with induction heating", which is a continuation application of U.S. patent application Ser. No. 14/452,800 filed Aug. 6, 2014 entitled "Catalytic converter structures with induction heating", now issued as U.S. Pat. No. 9,488,085, which claims priority from U.S. Provisional Application 61/879,211 entitled "Catalytic converter employing electrohydrodynamic technology" filed Sep. 18, 2013 and U.S. Provisional Patent Application 61/910,067 entitled "Catalytic converter using field heating of metal component" filed Nov. 28, 2013.

The disclosures of all of the above-numbered applications are hereby incorporated herein by reference in their entirety and made part of the present application for all purposes.

FIELD OF THE INVENTION

This invention relates to processes for the manufacture of emissions treatment components for use in catalytic converter, particulate filter (PF) and selective catalytic reduction (SCR) systems that are suitable for motor vehicles. The invention includes emissions treatment components made by such processes.

BACKGROUND

Emissions treatment units are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

An emissions treatment unit such as a catalytic converter may take any of a number of forms. Typical of these is a cylindrical substrate of ceramic material generally called a brick. The brick has a honeycomb structure in which a number of small area passages or cells extend the length of the brick, the passages being separated by walls. There are may be from 100 to 1200 cpsi in the cross-sectional area of the substrate unit with walls in the range 0.002 to 0.02 inches in thickness. Most units are typically from 400 to 900 cpsi and 0.006 to 0.008 inches wall thickness. The ceramic substrate is formed in an extrusion process in which green ceramic material is extruded through an appropriately shaped die and units are cut successively from the extrusion, the units being then cut into bricks which are shorter than a unit. The areal shape of the passages may be whatever is convenient for contributing to the overall strength of the brick while presenting a large contact area at which the flowing exhaust gases can interact with a hot catalyst.

The interiors of the passages in the bricks are wash-coated with a layer of the particular catalyst material. The wash-coating is prepared by generating a suspension of the finely divided catalyst in a ceramic paste or slurry, the ceramic slurry being to obtain adhesion of the wash-coated layer to the walls of the ceramic substrate. The wash-coating is typically a single step process with the substrate being dipped into a tank containing a precious metal slurry made up of platinum group metals (PGM), such as palladium, platinum and rhodium, in a clay suspension. The clay suspension carries the PGMs and provides a bonding surface between the PGMs and the ceramic substrate. Substrate lengths may be dipped multiple times to increase the PGM loading. The wash-coated parts are heated to 650° C. to cure the clay suspension. Substrate units 10 typically of the order of 6 inches in length are dipped in the catalyst solution and are then cut into smaller bricks 12. As an alternative to wash-coating to place catalyst materials on the substrate surfaces, the substrate material itself may contain a catalyst component so that that the extrusion presents catalyst material at the internal surfaces bounding the substrate passages or cells.

An emissions treatment system may have a series of such bricks, each having a different catalyst layer depending on the particular noxious emission to be neutralized. Catalytic converter bricks may be made of materials other than fired ceramic, such as stainless steel. In addition, ceramic substrates may have different forms of honeycombed cells or passages than those described above. For example, substrate cells can be hexagonal or triangular in section. In addition, if desired for optimizing strength and low thermal capacity or for other purposes, some of the extruded honeycomb walls can be formed so as to be thicker than other of the walls or formed so that there is some variety in the shape and size of honeycomb cells. Junctions between adjacent interior cell walls can be sharp angled or can present curved profiles.

Another common form of emissions treatment unit is a particulate filter (PF). PFs may or may not be catalyst coating on the passage walls. In PFs, a checkerboard subset of cells in a ceramic substrate have their front ends plugged, the 'reverse' checkerboard subset of cells have their back ends plugged, and gaseous emissions are treated by being driven though porous walls of the honeycomb structure from cells of the first subset into cells of the reverse subset. In the course of the emissions gas passing through the walls, particles of soot and like matter are prevented from passing and accumulate on the walls. Periodically, the soot and other deposited material are burned off. Gaseous emissions treatment units to which the present invention is applicable also includes SCRs.

Whether for a catalytic converter, PF or SCR, the ceramic honeycomb brick is wrapped in a ceramic fibre expansion blanket. A stamped metal casing transitions between the parts of the exhaust pipe fore and aft of the catalytic converter and encompasses the blanket wrapped brick. The casing is made up of two parts which are welded to seal the brick in place. The expansion blanket provides a buffer between the casing and the brick to accommodate their dissimilar thermal expansion coefficients. The sheet metal casing expands many times more than the ceramic at a given temperature increase and if the two materials were bonded together or in direct contact with each other, destructive stresses would be experienced at the interface of the two materials. The blanket also dampens vibrations from the exhaust system that might otherwise damage the brittle ceramic.

In use, the encased bricks are mounted in the vehicle exhaust line to receive exhaust gases from the engine and to pass them to the vehicle tail pipe. The passage of exhaust gases through the catalytic converter heats the brick to promote catalyst activated processes where the flowing gases contact the catalyst layer. Especially when the vehicle engine is being run at optimal operating temperature and when there is substantial throughput of exhaust gases, such converters operate substantially to reduce the presence of noxious gaseous emissions entering the atmosphere.

Conventional emissions treatment systems have shortcomings at start-up when the interior of the brick is not at high temperature and during idling which may occur frequently during city driving or when stopping for a coffee at Tim Hortons. The transfer or migration of heat in these types of emissions treatment unit occurs by a combination of convection, conduction and radiation, the various heating mechanisms having differing levels of transfer at differing working temperatures. In particular, at low temperatures before the converter has reached optimal operating temperature, heat transfer is predominantly by convection of gases and by conduction along and through the interconnected ceramic walls. At normal operating or 'light off' temperature of an emissions treatment unit—of the order of 300° C.—heat transfer by radiation increases significantly. Light-off temperature is the temperature at which the metal catalyst is hot enough that it can accelerate the pollutant conversion processes previously described. Light-off is sometimes characterized as the temperature at which a 50% reduction in toxic emissions occurs. Catalytic converters, PFs and SCRs have low efficiency in a temperature range from ambient air start-up temperature to light-off temperature. Below light-off temperature, little to no catalytic action takes place. This is therefore the period during a vehicle's daily use during which most of the vehicle's polluting emissions are produced. Getting the catalytic converter, PF or SCR hot as quickly as possible is important to reducing cold start emissions.

SUMMARY OF THE INVENTION

Brief Description of the Drawings

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
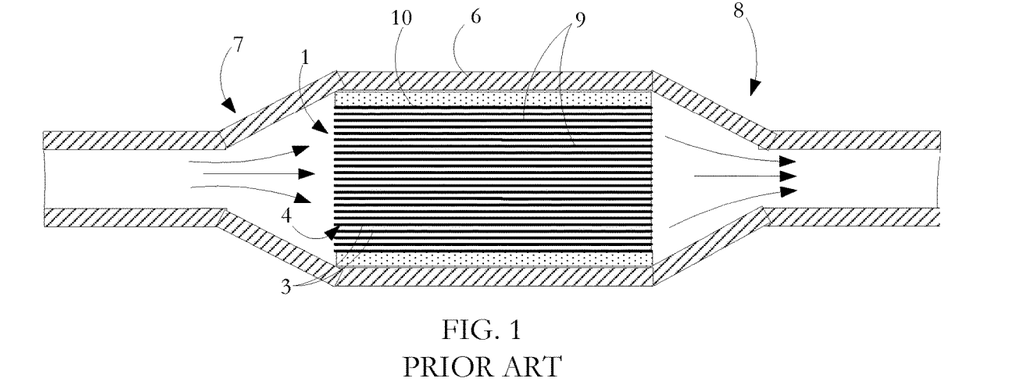
FIG. 1 is a longitudinal sectional view of a prior art gaseous emissions treatment unit.

Referring to FIG. 1, there is shown in longitudinal sectional view a ceramic substrate body 1 for use as a gaseous emissions treatment component. The substrate body or brick has a number of tubular cells or passages 2 extending throughout its length, the tubular cells divided by walls 3. The representation of the brick in FIG. 1 is not to scale. Across the cross-sectional area of a brick, there are in the range of from 100 to 1200 cells per square inch (cpsi) with cell wall thicknesses in the range 0.002 to 0.02 inches. The length of the substrate body is typically of the order of 3 inches but may be shorter or longer depending on various factors such as how it is to be loaded with catalyst.

In the manufacture of the ceramic substrates bodies, extrusion dies are configured to take a single flow source of ceramic paste from an extruder and to split it into a multicellular substrate. Because friction generated in the die produces high back pressures on the back side of the die, the ceramic material is extruded in a 'green' (or unfired) plastic state. A suitable ceramic material for the substrate is cordierite, which is a form of aluminum magnesium silicate $Al_{14}Mg_2Si_5O_{18}$. It has a low thermal expansion coefficient, moderately high strength, and low cost which makes it a favored choice for the substrate component of a catalytic, PF or SCR. Alternative substrate materials can also be used. For example, silicon carbide may be advantageously used for certain high temperature or diesel applications. Once extruded, units are cut from the extrusion as it emerges from the die. The units are then kiln dried and fired at a temperature of the order of 1300° C.

For eventual use in catalytic converters, bricks are immersed in a wash-coat containing a base material suitable for ensuring adherent coating onto the fired ceramic and entrained catalyst for use in promoting gaseous emissions treatment reactions. The outside of the ceramic substrate unit is masked to inhibit the catalytic layer from coating the outside of the unit. Examples of such catalysts are platinum and palladium which are effective in converting carbon monoxide and oxygen to carbon dioxide, and rhodium which is effective in converting nitric oxide to nitrogen and oxygen. Other catalysts are known which promote high temperature oxidation or reduction of other gaseous materials. Following drying of the wash-coat layer 4, the substrate body 1 is mounted within an expansion blanket 5 and an outer casing 6. The casing includes a front end adaptor 7 section for fixing to an upstream part of a vehicle exhaust pipe and a back end adaptor section 8 for fixing to a downstream part of the exhaust pipe. More than one brick may be mounted in the casing 6 to promote different reactions. Alternatively, multiple bricks may be separate and have their own individual casings.

Although not evident from FIG. 1, the ceramic substrate body 1 has a circular cross section and square cross-section cells. Alternative substrate cross-sectional shapes include rectangular, elliptic, oval, etc. Alternative cell cross-sectional shapes include hexagonal, triangular, circular, etc.

U.S. patent application Ser. No. 14/452,800 (Catalytic converter structures with induction heating), now issued as U.S. Pat. No. 9,488,085 and assigned to the present Applicant, describes a catalytic converter assembly having a substrate body with a plurality of cells for passage therethrough of exhaust or emissions gases to be treated. In the depiction of such a catalytic converter assembly shown in FIG. 2, metal 9 is located at predetermined locations in selected cells 14 and a coil 10 or other electromagnetic field generator is mounted around the substrate body 1 for use in generating a varying electromagnetic field inductively to heat the metal 9 and so heat the substrate body 1. In the exemplary structure shown, the metal 9 comprises metal particles within a matrix of cured mastic.

Figure 2:
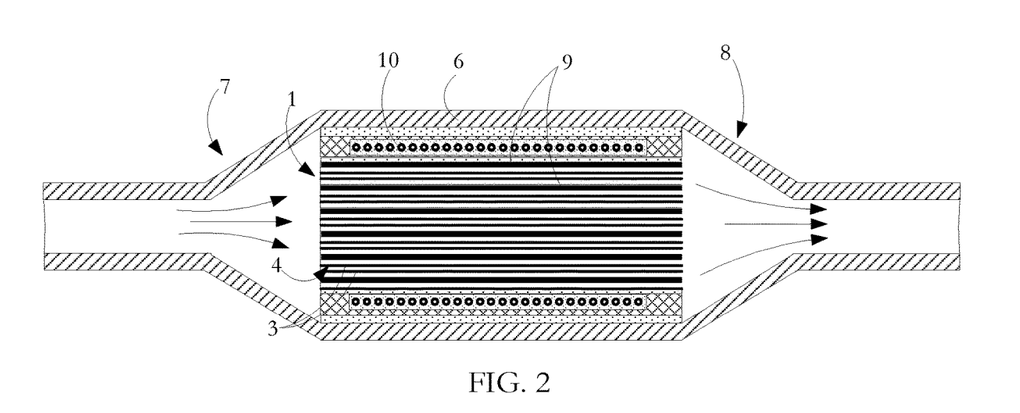
FIG. 2 is a longitudinal sectional view of a gaseous emissions treatment unit made by a process according to one embodiment of the invention.
Figure 3:
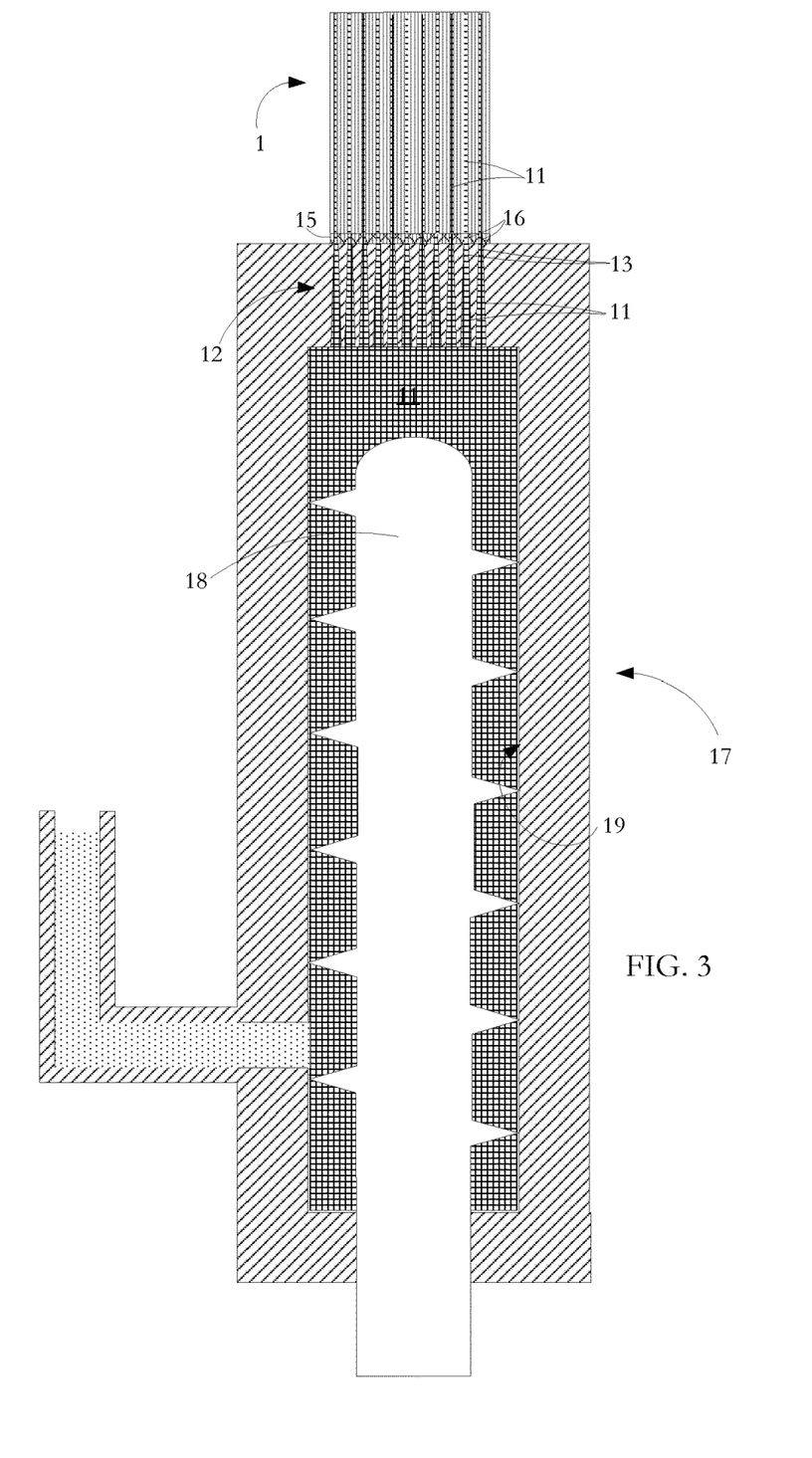
FIG. 3 is a sectional view through an insulation injection station used in a process according to an embodiment of the invention.

Referring to FIG. 3, in a process according to one aspect of the present invention for manufacturing the FIG. 2 structure, a mixture 11 of flowable, uncured mastic material and entrained metal particles is injected from an extrusion unit 17 along selected cells 14 of the multi-celled ceramic substrate body 1 so that the selected cells 14 are filled throughout at least part of their lengths. As shown, the extrusion unit 17 uses a screw conveyor 18 to move the mixture 11 along and out of extrusion chamber 19. A ram extruder could alternatively be used.

An injection head 12 made of stainless steel has an external diameter matched to the diameter of the substrate body 1. The injection head 12 has injection apertures or nozzles 13 for alignment with the selected cells 2. Alternative forms and dimensions of injection head 32 are used for different substrate cross sectional areas and shapes and for different cell injection patterns. Other suitable materials can be used for the injection head provided that they are dimensionally stable over time and when subjected to temperature variation, and provided also that the material of the injection head 32 (or at least the surrounding interior of the injection path within the die) does not react with or adhere to the injected material. Robotically controlled handling equipment is used to move and clamp the injection head 32 and the substrate unit 10 in a precise registration so that selected cells 14 of the substrate body 1 are optimally aligned with the injection apertures 13 in the die. Photoelectric sensors having light emitters and detectors at opposite ends of the substrate are used to direct super-collimated light along the passages during the registration step. The level and location of detected light are used to develop control signals to handling equipment to achieve fine adjustment of an initial registration position of the injection head 12 relative to the substrate body 10 so as to obtain the cleanest possible division between cells 14 that are to be filled with injected mixture 11 and the other cells 2 that are to be left unfilled. The alignment procedure is supplemented by the use of a machine cut template or gasket 15 at the injection face of the injection head 12. The gasket 15 has apertures 16 generally matching the positions of injection apertures of the injection head 12 but having perimeters specifically matched to the boundaries of the cells 14 to be filled. The gasket 15 is resilient and so accommodates any excursion from planarity of the end surface of the substrate body 1 into which the mixture 11 is to be injected. As an alternative to a separate gasket 15, the injection head 12 is formed of slightly deformable material such as high density plastic or PTFE. Consequently, when the die is pressed against the end of the ceramic unit, the die undergoes some rudimentary deformation sufficient to match the die to minor excursions from planarity of the end of the ceramic substrate body 1.

The injection process leaves intact the walls 3 of the ceramic honeycomb substrate body 1. In an alternative technique, cells are injected individually with no masking gasket using a small injection tip at the end of a robotic arm for precise placement. The process is more time consuming but generally gentler on the delicate walls 3 of the ceramic substrate body 1.

The injected mixture 11 is then cured and the metal particles in the cured matrix subsequently function as target metal for inductive heating when the substrate body 1 is installed and used in an emissions treatment unit. Particularly suitable metals for induction heating are ferromagnetic metals and metal alloys such as stainless steel grade 430 which has high magnetic permeability and corrosion resistance. Lower permeability alloys such as 300 or 400 series stainless steels may also be used. Alternative metals and metal alloys can be used depending on particular properties required. Metals having very high magnetic permeability may also be used. For example, Kanthal iron-chrome-aluminum alloy stock manufactured by Sandvik has a relative permeability of 9000 and greater. High relative permeability can be achieved using other alloys including nickel-iron and iron-cobalt alloys.

The small cell size makes flow of injected mixture along the cells difficult. While flow can be improved by increasing injection pressure, an injection pressure less than an experimentally predetermined limit must be preserved so as not to jeopardize the integrity of the thin cell walls. Use of a mastic having an appropriately low viscosity is therefore important so as to achieve flow into and along the selected cells without exceeding the injection pressure limit. Provided the viscosity is sufficiently low that injection can be obtained without exceeding the pressure limit, a structure is obtained with little or no distortion of cell walls and with resistance to lateral compression of the basic honeycomb structure being substantially maintained. In most circumstances, a mastic having a viscosity in the range from 2 to 3,000 millipascal-seconds (mPa-s) allows effective injection, the actual selection of viscosity depending on the flow resistance contribution of a number of factors including:

cells density (cpsi)
    cell cross sectional shape
    wall surface roughness
    relative volumes of metal and mastic
    metal particles shape(s)
    metal particles size(s)
    length over which the material is to be injected
    air resistance to injection (if injecting from each end of cell)
    temperature effect on substrate size and material
    temperature effect on mastic
    temperature effect on metal particles
    injection into cell that is closed (particulate filter) or open (through catalytic converter)
    liquid content/rheology.

Depending on the cumulative effect of the listed factors, a mastic viscosity outside the range indicated previously may be necessary. For example, a higher mastic viscosity in the range 3,000 mPa-s to 1,000,000 mPa-s or a lower viscosity in the range 0.9 mPa-s to 2 mPa-s may be more effective for a particular combination of these factors.

As shown in FIG. 3, injection takes place upwardly but the mastic-metal particle mixture can alternatively be injected downwardly or laterally. Cells not injected with the mastic-metal mixture retain their catalytic converter, PF or SCR functionality in terms of allowing the flow of emissions gas and its gaseous emissions treatment.

The mastic-metal particle mixture is formulated so that, as it is injected, it does not flow out of the far end of a selected cell. Having the mastic-metal particle mixture behave in this manner again depends on a number of empirically determined factors including cpsi, surface tension of the mastic, viscosity, adhesion properties, porosity and surface roughness of the substrate body walls.

As previously mentioned, the injection head 12 and the substrate body 1 are mounted so that the injection head 12 or gasket 15 is press and seal against the substrate body 1 to prevent leakage of injected material 24 into cells 2 adjacent cells 14 selected for injection. To achieve a clean surface at the other end of the substrate, either the area of non-selected cells is temporarily masked off or a similar gasket arrangement is used on the exit end.

The mastic component of the mastic-metal particle mixture injected into the selected cells 14 is a paste-like mixture of finely divided mineral, binder and liquid. In this specification, the word 'mineral' is intended to encompass naturally occurring minerals, clays and ceramics, glassy or amorphous solids such as alumina, zirconia, magnesia, silica, synthetically prepared minerals, and the like.

The mastic component in its uncured, injectable form is chosen or formulated to behave as an essentially homogeneous mass exhibiting Newtonian fluid properties. The mastic retains its shape and so remains within the selected cell 14 upon injection. The viscosity and applied injection pressure are empirically chosen so that the mixture is driven into all corners of the honeycomb cellular spaces. For the small cell sizes involved, frictional resistance to injected material flow is high and as indicated in the above list, corresponding adjustment of the mastic component may be required to modify its rheology to enable effective injection.

The liquid is typically water although other liquids such as certain oils, fuels, coolants, etc., can be used depending on the particular application and on the nature of the metal, the ceramic of the substrate body, and the other components of the mastic.

The binder—typically a polymer binder—is chosen or formulated so that the mastic adheres to the ceramic wall surfaces notwithstanding its low viscosity. Bonding is enhanced by the high interfacial surface area between the injectant and substrate body ceramic as a function of the enclosed volume of injected material. In the course of curing, volatile components of the binder are driven off and the remaining non-volatile elements knit the mineral and metal particles together to provide a solid structure inside the accommodating cell. Suitable binders for most mastic-metal particle injection applications are sodium silicate, magnesium aluminum silicates, bentonites, polyvinyl alcohol, starches, methylcelluloses, dextrin, waxes, glycols, lignosulfonates, etc., with selection being empirically determined to obtain optimal binding performance for the particular application. For example, binders for use with particles made of metal subject to corrosion are selected or modified so as to exclude any corrosion agent. The minerals themselves also contribute to binding the cured mass together through particle-to-particle interlocking. Where clays are used, the clay provides green and dried inter-particle binding deriving from the clay's affinity for water The injected cured mastic-metal particle mixture is typically formulated to have a maximum service temperature of the order of 1200° C. so that it is not damaged at the normal upper operating temperature of conventional catalytic converter, PFs and SCRs, this being of the order of 1000° C. The cured material is durable and, while not as strong as the ceramic substrate, is well able to survive the combination of heat and vibration produced in regular operation of an upstream internal combustion engine. The cured injected material is relatively inert and resists thermal shock. Once cured, the mixture forms a closely clumped network of metal particles, mineral particles and elements of the binder from which vaporizable components have been driven off.

The cured mastic is formulated to have some flexibility in response to temperature cycling in order to accommodate differences in expansion and contraction of its components and relative to the surrounding substrate ceramic. There is consequently a low risk of operational thermal cycling creating failures or defects. The cured material is formulated also to have a thermal conductivity equal or slightly higher than the thermal conductivity of the surrounding ceramic. Physical characteristics of the substrate ceramic are substantially mirrored in the cured mastic-metal particle mixture so that the combination has a monolithic character rather than consisting of proximate but separate phases.

The injected mastic material can be cured in any of a number of ways including microwave heating, induction heating, air drying, oven heating, and autoclave heating (i.e., heating under pressure or vacuum). Following curing, any cured material projecting from or adhering to the end surfaces of the ceramic substrate body is removed.

Microwave irradiation is the preferred form of curing. The ceramic of the substrate body is virtually invisible to microwave energy and so the energy goes straight to the injected mastic-metal mixture to effect curing. The metal particle component is a natural sink for the radiation and the injected material quickly heats up and cures with very little heat loss to the ceramic honeycomb. The microwave set-up can be configured so the contained material is irradiated from both sides of the accommodating cell to effect rapid curing.

Induction heating is somewhat similar to microwave curing in terms of directly heating the metal particles which then heat the surrounding mastic. However, microwave radiation is superior because it also heats the liquid phase within the mastic.

Air drying is a very slow but steady process in which the injected column are exposed to air that circulates at room, or slightly elevated, temperature, but below 100° C. if the liquid in the mastic is or contains water. Oven curing is similar to air drying but is performed at temperatures above 100° C. The oven can have convection flow to circulate gases for faster curing. Both air and oven curing are slowed by the thermally insulating property of the substrate body walls.

Autoclave, i.e., sealed heating under an applied pressure or an applied vacuum is similar to oven curing but with the addition of pressure or vacuum to exploit certain curing reactions. Curing under high pressure tends to render the injected material denser, while curing in a vacuum tends to render the injected material less dense and tends also to leave pores in the cured mastic.

An atmosphere other than air is used in some curing processes. For example, oxygen contained in air or water in the curing atmosphere will result in oxidation of certain particle metals such as iron. This is undesirable as it can result in reduced induction heating efficiency when the structure is used in an emissions treatment system. Argon or other reducing agents can be used in the curing atmosphere to prevent or reduce oxidation. A mastic-metal particle mixture containing graphite or graphite-derivatives as the 'metal' component for induction heating purposes also benefits from a reducing atmosphere because it increases the chance of the graphite retaining its conductivity during level curing. In this specification, the word "metal" when used to characterize metal in the metal particle-mastic mixture to be injected includes graphite and graphite compounds having induction heating capability.

The curing process drives off water or other liquid from the mastic component and activates polymer binders in a polymerization process that solidifies the injected mastic-metal mixture at its injected position. Vaporizable elements of the binders are driven off. The polymerization is one-way reaction so that any subsequent contacting of the cured material with water or other liquid does not return the cured mastic to its pre-cured low viscosity state. While the curing process is effected at relatively low temperature of the order of 650° C., the cured material can survive usual automotive application temperatures of the order of 1000° C.

Especially if a dense cured mastic matrix is desired, the rate of curing must not be so fast as to cause a rapid vaporization of water or other liquid and a relatively slower solidification of the other components of the mastic such as the binders as this may cause loss of integrity in the cured structure. In particular, if vaporizing elements are explosively ejected, extensive loss of homogeneity in the cured material or damage to the surrounding honeycomb ceramic may result.

Cured mastic material can range from porous/thermally insulating through dense/thermally conductive. Generation of pores during curing depends on such factors as mastic formulation, including water and volatile binder content, and curing conditions, such as speed of curing. Pores develop at the sites of entrained air bubbles, gases arising from chemical reactions, and vaporizing water and binder volatiles. In particular, during curing, vapor flows through the uncured matrix and through the substrate before escaping from the substrate. The vapour routes become the pores as the matrix cures. The pores are typically of the order of 1.5 millimetres and less across. By appropriately tuning curing parameters, porosity can be minimized. In contrast to microwave curing, air and oven curing tend to produce a more porous matrix.

To the extent possible, the existence of pores within the cured matrix is avoided because pores occupy sites that could otherwise be occupied by metal particles and because they adversely affect structural integrity. For low temperature emissions treatment applications, dense and thermally conducting mastic is used because thermal expansion stresses within the cured mastic-particulate metal matrix are low.

At the injection stage, pore minimization can be assisted by reducing the amount of liquid content without jeopardizing flowability of the mastic-metal particle mixture. If the liquid content is water, its relative content can be reduced while retaining flowability by adding water reducing admixes, some of which can reduce the water volume content in the uncured mastic by from 12 to 30% without compromising flow consistency. Typical flow enhancing admixes are sulfonated melamine, sulfonated naphthalene, and modified lignosulfonates and typically make up from 0.1 to 0.5% in volume of the mastic/metal particle mixture. The admixes are typically 40% by volume of active agent. Upon curing the admixes contribute to the binding of the cured mixture.

Some degree of porosity in the cured mixture is desirable for high temperature applications such as high performance motor racing using high octane gasoline and additives where temperatures at the emissions treatment unit can reach 1100° C. In this environment, the cured mastic matrix is under great stress and its durability/survivability is tested. Pores in the cured mastic provide stress relief for thermal expansion/contraction gradients between the ceramic substrate, particulate metal and mastic which are in contact with one another but dissimilar in terms of expansion/contraction. A porous cured mastic is also less thermally conductive than a dense structure and so limits the temperature increase of material within an injected cell in response to high temperature spikes at the emissions treatment unit.

In another embodiment of the invention, some, but not all of the lengths of selected cells are occupied by the injected mastic-metal particle mixture. In one embodiment, the mixture is injected to occupy the input end of a cell, with rest of the cell length constituting an air gap or gaps. The material is alternatively injected a short distance in from each end. In another example, particularly suitable for PFs, specific cells of the substrate are injected from one end while the other cells of the unit are injected from the other end so as to form an offset checkerboard formations at the ends of the substrate body.

The injection process described above can be effected on industry-standard ceramic substrate bodies so as to affect to a minimal extent the present-day supply chain sequence associated with catalytic converter, PFs and SCRs. Direct injection and curing of the mastic-metal particle combination leaves a substrate unit which in appearance and dimensions is very much like standard substrate units currently used in automobile manufacture.

In operation of the induction heated emissions treatment units in which the above described structures are incorporated, induction heating is dependent on, and can be tuned to, the nature of the metal particles entrained within the mastic. For example, induction frequency is chosen with a view to the identity of the metal because less magnetic metals typically require higher operating frequencies to be heated to a certain temperature than do more magnetic metals. The frequency is chosen also in dependence on metal particle size because smaller particles typically require higher operating frequencies to heat to a certain temperature than do larger particles.

As a corollary, during manufacture, the metal particles to be entrained in the injected mastic are selected with a view to that dependence. Various parameters including metal identity, metal particle size, metal particle shape, concentration of metal in mastic, relative concentration of metal particles along a cell length and relative concentration of metal particles across a cell width can be selected with a view to eventual heating performance and to tuning of that performance.

As to metal identity, the metal particles must be readily heatable when an oscillating induction field is applied. Particularly suitable metals are iron, steel (including stainless steel) and iron and steel alloys containing nickel, chrome, cobalt, aluminum and/or silicon. Particles of some non-metal induction heating materials such as graphite may also be used. The choice of metal is made with dependence on many factors one of them being the particular demands of the end-use emissions treatment system. For example, diesel applications generally operate at temperatures much lower than gasoline applications and so a metal with a lower melting point can be used. In a further example, urea may be present in some SCR diesel applications and so require the use of a non-corrodible alloy. In one embodiment, different particles may be made of different metals or alloys.

As to particle size, particles can be anything from metal powder to particles of a size just less than the width of the cell into which the metal-mastic mixture is to be injected. In one embodiment, special channels larger in width than the cell width notionally set by the substrate cpsi are created in the substrate either through using specially configured dies during green ceramic extrusion of the substrate or subsequently by machining the fired ceramic In the latter case, the machined channel can extend over all or part of the substrate length depending on where induction heating is to take place. The larger width channels accommodate larger sized particles where the emissions treatment application warrants that.

As to metal particle shape, this may be any of, spherical, cubic (i.e., faceted, elongate, irregular etc., with the shape depending on the processing method for making the particles. A common particle size and shape may not result in an ideal particle packing density but renders the injection process more predictable and, in operation, provides a more predicable heating effect. Uniform size spherical particles have a very predictable packing factor and performance—both in terms of flowability of the injected mastic-metal mixture and subsequent thermal and electrical performance in emissions treatment operation. Because shape is regular and orientation is irrelevant, spherical particles are readily flowable and easy to inject at relatively low pressure. In one embodiment, the concentration of metal is increased by having spherical particles of different sizes. For closely packed spherical particles, mid-sized particles occupy interstices between large particles and small particles occupy interstices between the mid-sized particles. High concentration of metal component in the mastic-metal mixture is important because the more metal contained in the mixture, the more heat that can be generated during emissions treatment operation.

In another embodiment, the metal in the mastic-metal particle mixture has a uniform or non-uniform range of metal particle sizes with particle sizes within that range being anything from powder metal to particles which are only slightly less in size than the size of the selected cell apertures. Particular combinations of multiple particle sizes and relative concentration of differently sized particles may be tailored with a view to achieving particular induction heating effects and/or injectability.

However, the final concentration of metal in the mastic must not be so high that there is insufficient binder and liquid to effect flow upon injection and high integrity solidification on curing. For sustained performance and long lifetime when operating in an emissions treatment application, it is preferred that the composition of the cured injectant be homogeneous to the extent possible given its several different components. Care must therefore be taken in adopting a non-homogeneous distribution of metal particles in a cell to prevent, to the extent possible, any drastic compositional changes at any point in the injected cured metal-mastic matrix because they could become sites of high operational stress. A minor drawback of having a range of particle sizes is that in operation in an emissions treatment application, no single induction frequency provides optimal heating of all metal particles. Instead, induction frequency is tuned to an average particle size or mass.

In one embodiment using metal dust/fines in the injectant, following injection, the unit is sintered to melt surface regions of the powder/fines and to have them coalesce into connected chains. The fines/dust tend to melt or wet more readily than heavier particles because of their low mass and cumulative high surface area. The presence of metal fines/dust increases the probability of direct contact areas between larger particles. While there is a direct contact benefit to fusing particles together, the fusing process can only be implemented in conditions in which the substrate will not be damaged by the applied heat. For such sintering, silicon carbide, zirconia, or alumina substrates having high manufacturing temperatures are used.

Packing density of the particles can be increased by vibrating/agitating/centrifuging the substrate to cause settlement of the injected particles before curing. Depending on the imposed movement, particle settlement can be made directional: for example, to have a greater concentration of the particles towards one end of the substrate or towards a particular radial position in the cells. The former can be useful for generating induction heating at a localized position—for example, near one end of the substrate—for operational purposes. Some movement and repositioning of particles either during injection or after injection and before curing can also be achieved using a magnetic field. In another embodiment, for subsequent shaping the direction and strength of magnetic flux in the substrate when in operational use, lower magnetic permeability metals/alloys are used for metal particles in outer substrate cells with relatively higher magnetic permeability metals used for metal particles in the inner cells. In the case where metal particles having different compositions are used, the above described techniques can also be used to reposition particles of one metal phase relative to particles of another metal phase.

Ease of injection and packing factor for regularly shaped particles having flat surfaces is less predictable than for spherical particles because of the effect of orientation; i.e., whether a face, edge, or vertex of a particle is oriented normal to the cell opening cross-section. The same issue pertains for irregularly shaped particles.

Elongate particles, which may be any of pill shaped, cylindrical, rectangular prism, etc., if randomly orientated, also have a high flow resistance and so require a high injection pressure. An abrupt transition from injection vessel to selected cell results in much of the initial orientation randomness being retained because there is insufficient distance and time for flow-induced alignment of the particles. Packing density and contact benefits of elongate particles can be increased by imposing some alignment of the particles either before injection, by using an extended and progressively narrowing approach route as the mastic-metal particle mixture is forced towards the injection point, or after injection but before curing, by vibration, etc. In an alternative embodiment to increase alignment, the mastic-metal mixture is passed at low pressure through a pre-injection chamber where physical agitation and/or, for ferromagnetic metals, applied magnetic field is used to pre-align. Eddy current magnetics or high-current magnetic fields can be used to increase alignment of non-magnetic (such as copper or zinc) metal particles.

The amount of particle-to-particle contact and particle-to-cell wall contact in the cured matrix are important because they influence thermal and induction heating performance, in the latter case both as to heating intensity and thermal conduction. When the emissions treatment unit is in operation, metal particles separated from neighbouring particles heat up with little or no interaction with the neighbouring particles. Depending on the applied induction frequency, isolated particles develop eddy currents and corresponding heating occur only at a particle surface region. In contrast, metal particles in direct contact with their neighbours, while developing the same surface region eddy currents, also experience thermal and electrical conduction between them leading to improved heat transfer. To provide a high level of direct particle contact, a volume concentration of between 64% to 78% metal and 36% to 22% mastic is adopted, 78% metal being the practical limit in order that a metal particle-mastic mixture remains injectable.

In one example for a ceramic unit having 400 cpsi and a will thickness of 6 mil, the metal component within the mastic-metal particle mixture consisted of two phases: spherical ferritic stainless steel particles of 0.040 inch diameter; and spherical ferritic stainless steel particles of 0.010 inch diameter. The large particle concentration was 52.36% by volume and the small particle concentration of 3.27% by volume, with overall metal concentration (large+small) of 55.63% by volume. Practically, the 0.040 inch diameter particle was the largest size that could be used with this cpsi because when the mastic-metal particle mixture was injected into the selected cells, the particles had to be small enough to pass into the cell opening.

In an alternative two-step process, metal particles in a small amount of binder were flowed into selected cells so that the metal-binder mixture was deposited on the cell walls. A mastic or mastic-metal particle mixture was then injected so as to be constrained within the coated walls of the selected cells.

The level of concentration of the metal in the mastic-metal mixture is important for heating efficiency which depends on intensity and distribution. Heating intensity is the result of high excitation of the metal in the induction field. Heating distribution is how well that heat is spread throughout the injected volume. Obtaining high heating efficiency is a balance between intensity and distribution. A low concentration of particulate metal results in high intensity but poor distribution because the metal particles are spaced far apart and/or spaced non-uniformly. A high concentration of metal produces a good distribution but low intensity because the high mass of metal shares a finite amount of input energy.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. A process for manufacturing a component for an emissions treatment unit, comprising taking a ceramic unit prepared by extruding green ceramic product through a die to form an extrusion having a honeycomb substrate structure having an array of parallel, linear tubular cells extending along the extrusion, the cells bounded by walls dividing adjacent cells from one another, the ceramic unit being obtained by cutting off, curing and firing a length of the extrusion, the process further comprising, following the firing, injecting a mixture of a flowable, uncured curable material and a particulate metal component from an end of the ceramic unit into selected ones of the cells so as to block the selected cells over at least a part of the lengths thereof while maintaining all of the walls of the ceramic unit, and curing the injected mixture to render the injected mixture solid.

2. The process as claimed in claim 1, wherein the flowable, uncured curable material contains a liquid being at least one of water, oil, fuel and coolant.

3. The process as claimed in claim 2, wherein at least part of the liquid is water mixed with a flow-enhancing admix.

4. The process as claimed in claim 3, wherein the admix is at least one of sulfonated melamine, sulfonated naphthalene, and modified lignosulfonates.

5. The process as claimed in claim 1, wherein the mixture has a viscosity in the range from 0.9 to 1,000,000 millipascal-seconds (mPa-s).

6. The process as claimed in claim 5, wherein the mixture has a viscosity in the range from 2 to 3,000 mPa-s.

7. The process as claimed in claim 1, wherein the flowable, uncured curable material includes a binder to bind components of the injected mixture together during and after said curing.

8. The process as claimed in claim 7, wherein the binder is a polymer binder, which binder undergoes polymerization in the course of said curing.

9. The process as claimed in claim 1 further comprising increasing concentration of the metal particles at a location in at least one of the selected cells into which the mixture is injected.

10. The process as claimed in claimed in claim 9, wherein increasing said concentration is achieved by one of agitation, vibration, centrifugation and magnetic field influencing of the injected mixture.

11. The process as claimed in claim 1, further comprising using a gasket layer on an input end of the ceramic unit, the gasket layer having injection apertures confined by gasket sections situated to limit incursion of the injected mixture into cells other than the selected cells.

12. The process as claimed in claim 11, further comprising incrementally relatively moving the ceramic unit and an injection die for the injection of the mixture to optimize registration of the injection apertures to entrance openings of the selected cells.

13. The process as claimed in claim 1, wherein the flowable, uncured curable material contains particulate mineral.

14. The process as claimed in claim 1, wherein the metal of the particulate metal component is one of iron, nickel, cobalt, stainless steel alloy, nickel-iron alloy, iron-cobalt alloy, iron-chrome-aluminum alloy, graphite and a graphite compound.

15. The process as claimed in claim 1, wherein the metal particles are one of irregularly shaped, spherical, faceted and elongate.

16. The process as claimed in claim 1, wherein the metal particles are present as one of uniform-sized and having a range of sizes.

17. The process as claimed in claim 1, wherein the curing of the injected mixture is effected by one of microwave irradiation, induction heating, air drying, oven drying and autoclave drying.

18. The process as claimed in claim 1, wherein the curing is conducted in a reducing atmosphere.

* * * * *